March 2, 1971   W. K. CAUSER   3,566,481

CHILD'S EDUCATIONAL TOY

Filed June 6, 1968

INVENTOR.
WANDA K. CAUSER
BY
Baldwin, Egan, Walling & Fetzer
ATTORNEYS

United States Patent Office 3,566,481
Patented Mar. 2, 1971

3,566,481
CHILD'S EDUCATIONAL TOY
Wanda K. Causer, 35387 Grover Road,
Eastlake, Ohio 44094
Filed June 6, 1968, Ser. No. 735,158
Int. Cl. G09b 1/16
U.S. Cl. 35—8      3 Claims

ABSTRACT OF THE DISCLOSURE

An educational toy to teach a child the manipulation of various articles of clothing required to enable the child to learn how to clothe himself. The toy is pillow-like in construction and sufficiently small in size to be easily carried and manipulated by a young child, as for example three years of age. The pillow partakes of any number of geometric shapes such as cubic, pyramidal, prismatic or the like, and has a plurality of faces or sides. A simulated article of clothing is attached to the faces or sides of the pillow, each article requiring the child to perform a dressing and/or undressing task such as operate a zipper; button and unbutton a shirt; buckle and unbuckle a belt; tie, untie and thread a shoelace; open and close snap-type fasteners and put on a pair of gloves.

---

This invention relates to child's toys and more particularly to an educational toy for a child which is intended to teach the manual manipulation of various articles of clothing and fasteners therefor so that the child may learn to dress and/or undress himself.

A primary object of the present invention is to provide a new and novel educational toy which is especially designed to teach a child the manual manipulation of various articles of clothing so that the child may learn how to dress and/or undress himself.

Another object of the present invention is to provide a new and novel educational toy for a child as above defined and which may be easily carried by a small child.

Another object of the present invention is to provide a new and novel educational toy for a child as above defined and which may be formed of readily washable materials.

Still another object of the present invention is to provide a new and novel educational toy which includes various simulated articles of clothing whereby a child may learn how to manually manipulate such clothing and thereby learn how to clothe himself Additional objects and advantages of the educational toy of the present invention will be apparent to one skilled in the art to which it pertains, and upon reference to the following disclosure of a preferred embodiment thereof and which is illustrated in the accompanying drawings wherein.

Figure 1:
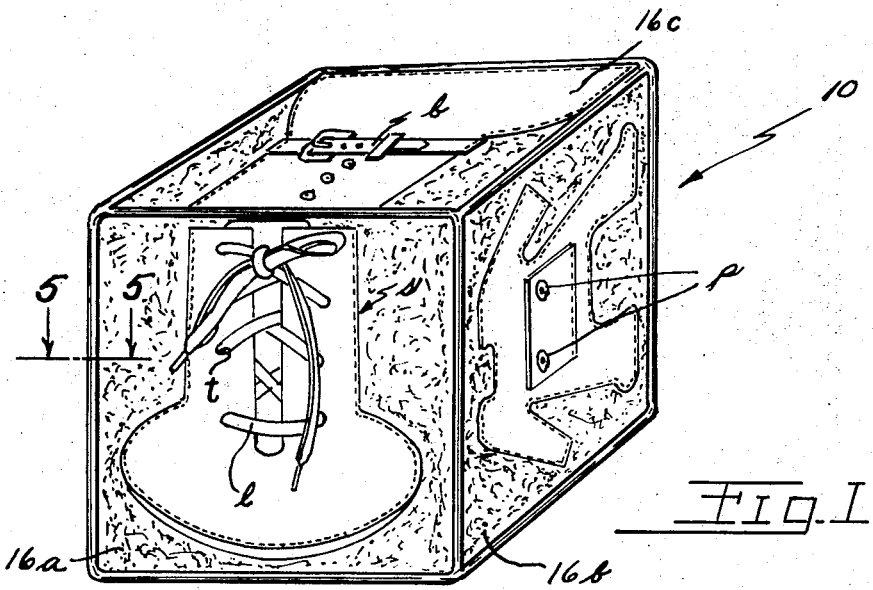
FIG. 1 is a perspective view of the educational toy in the form of a cubic pillow and which embodies the present invention.

Referring to FIG. 1 of the drawings, the embodiment of educational toy illustrated herein is in the form of a cubic pillow as identified in its entirety by the reference numeral 10. As heretofore mentioned, the pillow may partake of many additional geometric forms such as for example, but not limited to, pyramidal or prismatic, the basic requirement being that the pillow have a plurality of surfaces or sides.

Figures 4, 5:
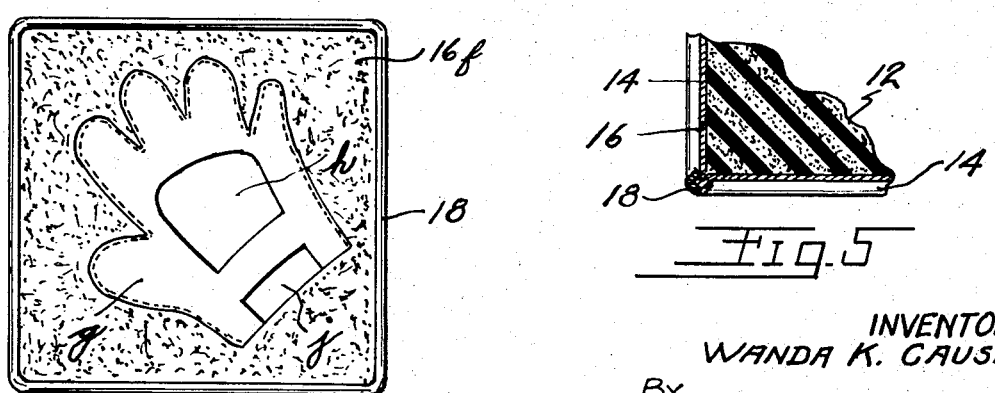
FIG. 4 is a front view of still another face of the cubic pillow of FIG. 1 and which shows a simulated glove thereon.
FIG. 5 is a partial sectional view taken approximately on line 5—5 of FIG. 1.

As seen in the cross-sectioned view in FIG. 5, the body of the pillow may be formed of any suitable washable material such as foam rubber as indicated at 12, being made in the geometric shape desired so as to provide a plurality of sides or faces 14.

The body 12 is enclosed within a suitable covering or case 16 which is intended to closely fit over each face of said body. For this purpose the covering or case is also made in the same geometric shape as the body 12, being, however, slightly larger in its dimensions as to readily accommodate the body therein.

The case 16 is seen to comprise a plurality of panels as are illustrated herein, and identified by the reference numerals 16a–16f, respectively. In its fabrication, the individual panels may each be made and connected together along the marginal edges thereof as indicated at 18 to form the case.

A simulated article of clothing is attached by any suitable means such as, for example, by sewing to each panel 16a–16f of the case, each said article requiring, as aforesaid, a particular task to be performed by a child to thereby teach the child the appropriate manual manipulation of said article of clothing.

For example, the panel identified at 16a is seen to have a simulated shoe "s" formed thereon and which includes a lace "l" threaded in the normal manner in eyelets "t." The lace is also illustrated as tied in the usual type of bow knot.

The child may first become acquainted with the lace, how it may be tied and untied, laced and unlaced, and thereafter, because the pillow may be easily carried by the child at any time he may "play" with lacing, tying, untying and unlacing the same to thereby become educated as to its structure and purpose. Each lace and associated eyelets may also be of a different color so as to enable the child to associate the lace with its associated group of eyelets and thus assist in the child learning the proper way in which to lace its shoes.

Figures 2, 3:
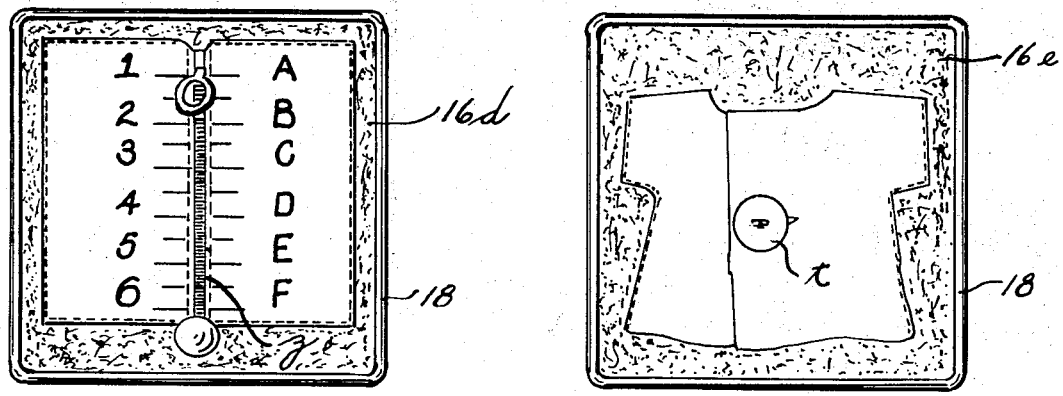
FIG. 2 is a front view of one face or surface of the pillow structure of FIG. 1 and showing a simulated article of clothing in the form of a zipper fastener.
FIG. 3 is a front view of another face of the pillow of FIG. 1 with a simulated shirt thereon having a button-type fastener.

In like manner, panel 16d as seen in FIG. 2 has a simulated article of clothing thereon which uses a zipper as identified at "z." Once the child is shown how the zipper may be open and closed, he may also subsequently operate the same and become likewise educated as to its operation.

Panel 16d also has printed or suitably attached thereon a part of the English numerical and lettering systems whereby the child can also begin to learn his "numbers and letters" as often referred to.

In similar fashion, panels 16b and 16c, as seen in FIG. 1, have simulated articles of clothing such as a child's nightclothes and dress which teach the utility of a snap-type fastener identified at "p" and a belt "b" respectively whereby the child may readily learn the operation and purpose for such articles.

Panels 16e and 16f of said pillow, as seen respectively in FIGS. 3 and 4, similarly show a garment such as a shirt which utilizes a button-type fastener "t" and a glove "g" whereby the child may learn to button and unbotton and put on and take off a glove.

While a single "button" garment is shown on panel 16e it is also contemplated that a plurality of similar garments may be placed thereon, one underneath the other so that the child, upon opening one, will see another immediately beneath the opened garment and may continue to unbutton the same. In this manner, the child may hasten his education as to the operation and purpose of such button-type garment.

The glove "g" is seen to preferably have cut-out portions "h" and "j" whereby the child may actually see his fingers and hand move into and out of the glove and thereby learn how to manipulate the same in putting on and taking off a glove in the proper fashion.

While only six different simulated articles of clothing and fastening devices therefor are herein illustrated, various others may also be readily applicable for application to the invention herein whereby a child may readily and easily be taught the function and purpose thereof.

Having described a preferred embodiment of educational toy for a child incorporating the present invention, it will be apparent that the same is susceptible to various modifications, arrangements and combinations of parts without departing from the inventive concepts herein as are identified in the claims.

What is claimed is:

1. A child's educational toy comprising a body in the form of a six-sided pillow having generally planar surfaces, means defining simulated articles of clothing on said surfaces, one of said simulated clothing means comprising a shoe including a shoelace and eyelets into which the shoelace may be threaded, another of said simulated clothing means comprising a shirt and including button means for retaining said shirt in closed condition, another of said simulated clothing means including a belt and buckle, another of said simulated clothing means including snap type fastening means, another of said simulated clothing means comprising a hand glove, and another of said simulated clothing means including a zipper, one each of said simulated clothing means being disposed on a corresponding surface of said body so that each surface of said body has one of said simulated clothing means secured thereto.

2. An educational top in accordance with claim 1 including a washable cover formed of six generally flat panels closely fitting over said body with each panel being disposed in close fitting relationship to a corresponding surface of said body said panels being connected along their juxtaposed edges to form a separate enclosing cover for said body, each of said panels having one of said simulated clothing means secured to the exterior thereof.

3. An educational toy as is defined in claim 1 and wherein the body is in the form of a cube.

References Cited

UNITED STATES PATENTS

| | | | |
|---|---|---|---|
| 191,167 | 5/1877 | Mueller | 35—27X |
| 2,413,828 | 1/1947 | Hirsh et al. | 5—339 |
| 2,501,902 | 3/1950 | Howell | 35—56 |
| 2,527,242 | 10/1950 | Clark | 35—56 |
| 2,995,865 | 8/1961 | Kiscadden | 35—56UX |
| 3,283,345 | 11/1966 | Berck | 5—339 |

HARLAND S. SKOGQUIST, Primary Examiner

U.S. Cl. X.R.

35—69